UNITED STATES PATENT OFFICE.

EDUARD VONGERICHTEN, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF MAKING DIAMIDO-DIPHENYLMETHAN BASES.

SPECIFICATION forming part of Letters Patent No. 471,659, dated March 29, 1892.

Application filed December 13, 1890. Serial No. 374,596. (No specimens.) Patented in Germany November 27, 1889, No. 53,937; in England December 23, 1889, No. 20,678; in France December 23, 1889, No. 202,769; in Belgium December 31, 1889, No. 88,989, and in Italy April 3, 1890, XXIV, 27,054, and LIII, 166.

*To all whom it may concern:*

Be it known that I, EDUARD VONGERICHTEN, doctor of philosophy, a subject of the Emperor of Germany, residing at Höchst-on-the-Main, in the Empire of Germany, have invented certain new and useful Improvements in the Production of Compounds of the Diphenylmethan Group, (patented in Germany November 27, 1889, No. 53,937; in England December 23, 1889, No. 20,678; in France December 23, 1889, No. 202,769; in Belgium December 31, 1889, No. 88,989, and in Italy April 3, 1890, XXIV, 27,054, and LIII, 166;) and I do hereby declare the following to be a full, clear, and exact description of the invention, such as will enable others skilled in the art to which it appertains to make and use the same.

This invention relates to the production of compounds of the diphenylmethan group by the action of formaldehyde upon certain aromatic amines. For example:

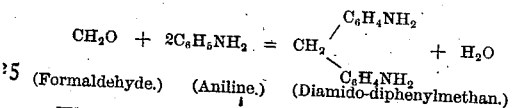

(Formaldehyde.) (Aniline.) (Diamido-diphenylmethan.)

The process is more fully explained by the process for the production of the diamido-diphenylmethan. By the action of formaldehyde upon aniline is obtained, as is well known, in the first stage the anhydro-formaldehyde aniline, $(C_6H_5N=CH_2.)$ The conversion of this compound into the diamido-diphenylmethan is proceeded with in the following way: Fifty parts of anhydro-formaldehyde aniline are heated on a water bath while being kept agitated together with seventy parts of hydrochlorate of aniline and an excess of aniline. The mass gradually becomes semi-liquid. After twelve hours it is rendered alkaline and the excess of aniline is driven off. The oil remaining after this solidifies in the form of a crystalline mass of diamido-diphenylmethan, which can be purified by recrystallization from benzole, from which it separates in the form of compact crystals. From water it separates in the form of brilliant leaflets, having a melting-point of 87° centigrade.

Instead of separating first the anhydro-formaldehyde aniline and subsequently causing it to act upon aniline, the production of the diamido-diphenylmethan may be carried out by combining the two stages of the operation, introducing the formaldehyde directly into the mixture of aniline and hydrochlorate of aniline.

The homologues of the diamido-diphenylmethan are produced in an analogous way. For example: Anhydro-formaldehyde aniline is caused to act upon hydrochlorate of ortho-toluidine and ortho-toluidine, anhydro-formaldehyde-ortho-toluidine upon hydrochlorate of aniline and aniline, anhydro-formaldehyde-ortho-toluidine upon hydrochlorate of ortho-toluidine and ortho-toluidine, anhydro-formaldehyde-aniline upon hydrochlorate of dimethylaniline and dimethylaniline, anhydro-formaldehyde-ortho-toluidine upon hydrochlorate of dimethylaniline and dimethylaniline, anhydro-formaldehyde-aniline upon hydrochlorate of diethylaniline and diethylaniline, anhydro-formaldehyde-ortho-toluidine upon hydrochlorate of diethylaniline and diethylaniline.

The compounds of the diphenylamine group are converted by formaldehyde in an analogous way into compounds of the diphenylmethan group. Thus, for example, diphenylamine (two mol.) in alcoholic solution and in presence of hydrochloric acid condenses with formaldehyde (one mol.) in violent reaction, forming a body $(C_{25}H_{22}N_2)$ which I denominate "diphenyl-diamido-diphenylmethan." The production of this body is carried out in the following way: One hundred parts, by weight, of diphenylamine are dissolved hot in two hundred parts, by weight, of alcohol, and then 22.2 parts, by weight, of formaldehyde of forty per cent. are added to the solution, which is then heated to 60° centigrade, five parts, by weight, of hydrochloric acid being added.

There is violent reaction, the mixture becoming dark. When the reaction is finished, the diphenyl-diamido-diphenylmethan is separated in the form of a solid crystalline mass. Left exposed to the air it assumes a yellow-brown color. The diphenyl-diamido-diphenylmethan is of difficult solubility or almost insoluble in all indifferent solvents. In aromatic bases alone it is somewhat easily soluble. In diluted acids it is insoluble; but on being heated in concentrated sulphuric acid it dissolves, assuming a brown color. In a like manner, formaldehyde reacts with other secondary aromatic bases—such as ortho and para tolylphenylamine, ortho-ditolylamine, alpha and beta naphthyl ortho-tolylamine, alpha and beta naphthylphenylamine, and also with mixtures of the secondary amines. Thus, for example, there is formed from formaldehyde (one mol.) diphenylamine (one mol.) and naphthylphenylamine (one mol.) a condensation product which is considered to be the naphthylphenyl-diamido-diphenylmethan. All these products have qualities similar to those of the diphenyl-diamido-diphenylmethan above described.

The non-alkalized diamido-diphenylmethan bases are of easy solubility in diluted acids, in alcohol, benzine, and toluene, of difficult solubility in water and ether. The phenylized diamido-diphenylmethan bases are nearly insoluble in all the indifferent solvents, but soluble in concentrated mineral acids.

What I claim as my invention, and wish to secure by Letters Patent, is—

The herein-described process for the production of diamido-diphenylmethan bases by the action of hydrochlorates of aromatic amines upon the anhydro-formaldehyde compounds of aromatic amines, substantially as set forth.

In testimony whereof I affix my signature in presence of two witnesses.

EDUARD VONGERICHTEN.

Witnesses:
JOSEF REVERDY,
HEINRICH HAHN.